United States Patent [19]

Carlberg et al.

[11] Patent Number: 5,002,126
[45] Date of Patent: Mar. 26, 1991

[54] RESERVOIR SCALE INHIBITION

[75] Inventors: B. L. Carlberg; Nicholas O. Wolf, both of Ponca City, Okla.

[73] Assignee: Conoco Inc., Ponca City, Okla.

[21] Appl. No.: 508,218

[22] Filed: Apr. 10, 1990

[51] Int. Cl.$^5$ .................. E21B 43/22; E21B 43/25
[52] U.S. Cl. ................................ 166/279; 166/300; 252/8.552
[58] Field of Search ............. 166/279, 300, 310, 902; 252/8.552

[56] References Cited

U.S. PATENT DOCUMENTS

| | | | |
|---|---|---|---|
| 3,167,123 | 1/1965 | Graham et al. | 166/279 |
| 3,467,192 | 9/1969 | Nolan, III et al. | 166/279 |
| 3,483,925 | 12/1969 | Slyker | 166/279 |
| 3,633,672 | 1/1972 | Smith et al. | 166/279 |
| 4,062,796 | 12/1977 | Gardner et al. | 252/8.552 X |
| 4,357,248 | 11/1982 | Berkshire et al. | 166/279 X |
| 4,602,683 | 7/1986 | Meyers | 166/279 |
| 4,713,184 | 12/1987 | Zaid | 252/8.552 |
| 4,860,829 | 8/1989 | Carlberg et al. | 166/279 |

Primary Examiner—George A. Suchfield

[57] ABSTRACT

Scaling of a production well in a non-carbonate subterranean reservoir is inhibited by injecting into the reservoir the water soluble surfactant metal salt containing a terminal metal ion which is adsorbed on the surfaces of the reservoir and thereafter injecting an inhibitor selected from the group consisting of phosphonates and polymeric carboxylates. The inhibitor reacts with the metal, precipitating as the metal phosphonate or polymeric carboxylate which slowly dissolves in production water to inhibit the formation of scale.

21 Claims, 2 Drawing Sheets

RESERVOIR SCALE INHIBITION

BACKGROUND OF THE INVENTION

1. Field of the Invention

This invention relates to scale inhibition in non-carbonate reservoirs.

Relatively low concentrations of water-soluble, organic scale inhibitors are known to reduce the rate of scale formation in and around the bottom of a producing well. Scales are slightly soluble inorganic salts, such as calcium or barium sulfates or calcium carbonate, etc. The mechanism of the inhibition is probably a combination of sequestering or complexing of multivalent cations and an absorption of inhibitor onto solid surfaces such as the rapid growth planes of newly formed crystallites. Although a wide variety of materials inhibit crystal growth, the compounds most commonly used in well treatments are organic phosphates or phosphonates, adducts of acrylic acid or the like. Where supersaturated, or scale-forming waters are encountered in an oil production operation, scale inhibitors are commonly injected or "squeezed" into the reservoir formation. The squeezing amounts to injecting the inhibitor and, usually over-flushing the treated zone with water. The well is placed back on production and the entrainment of the inhibitor in the produced water protects the wellbore and downhole equipment from scale build-up.

In recent years a procedure called "precipitation squeeze" has been developed. In this process, the scale inhibitor reacts or is reacted to form an insoluble salt which precipitates in the pores of the formation rock. For example, phosphonates and polymeric carboxylates can be precipitated as the calcium salt. Other inhibitors such as phosphate esters are not suitable since they do not readily form insoluble calcium salts. In practice, an acidic solution of a phosphonate, for example, is squeezed down a wellbore into a limestone or dolomite-containing reservoir. Here the acid acts on the carbonate to both neutralize the acid and put calcium ions into solution:

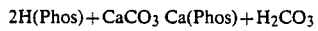

With rising pH and increasing calcium ion concentration, precipitation of calcium phosphonate takes place within the pore spaces of the rock. Following precipitation, the well is returned to production normally after 24 hours.

Precipitation squeeze treatments have proven very successful in carbonate reservoirs, generally reaching a longer useful life than with conventional adsorption-type squeezes. However, this technique is not applicable in non-carbonate reservoirs where only a limited amount of calcium is available downhole. The use of precipitation squeezes in non-carbonate (sand) reservoirs would be expected to provide the same extended life treatment now seen in carbonate reservoirs. To achieve such a squeeze in sandstones, both calcium ion and phosphonate must be included in the solution placed in the reservoir.

2. The Prior Art

U.S. Pat. No. 3,483,925 discloses a process in which a viscosity-increasing polymer (having a molecular weight between about 100,000 and about 10,000,000) is injected into a formation followed by the injection of an organic phosphonate scale inhibitor. Examples of polymers used are hydrolyzed acrylamide and copolymers of acrylamide.

U.S. Pat. No. 3,167,123 discloses injecting a high viscosity fluid, such as viscous crude oil into a formation followed by injection of a low viscosity corrosion inhibitor.

U.S. Pat. No. 4,860,829 discloses injecting a phosphonate inhibitor and a metal chelate into a non-carbonate reservoir to inhibit scaling.

SUMMARY OF THE INVENTION

According to the method of this invention a water soluble surfactant metal salt having a terminal metal ion is injected down a wellbore into a non-carbonate reservoir and is adsorbed on the surfaces of the reservoir. Subsequently an inhibitor selected from the group consisting of phosphonates and polymeric carboxylates is introduced into the reservoir and reacts with the metal in the surfactant salt, precipitating as the metal-inhibitor which slowly dissolves in water produced from the reservoir and inhibits scale formation.

DETAILED DESCRIPTION OF THE INVENTION

Figure 1:
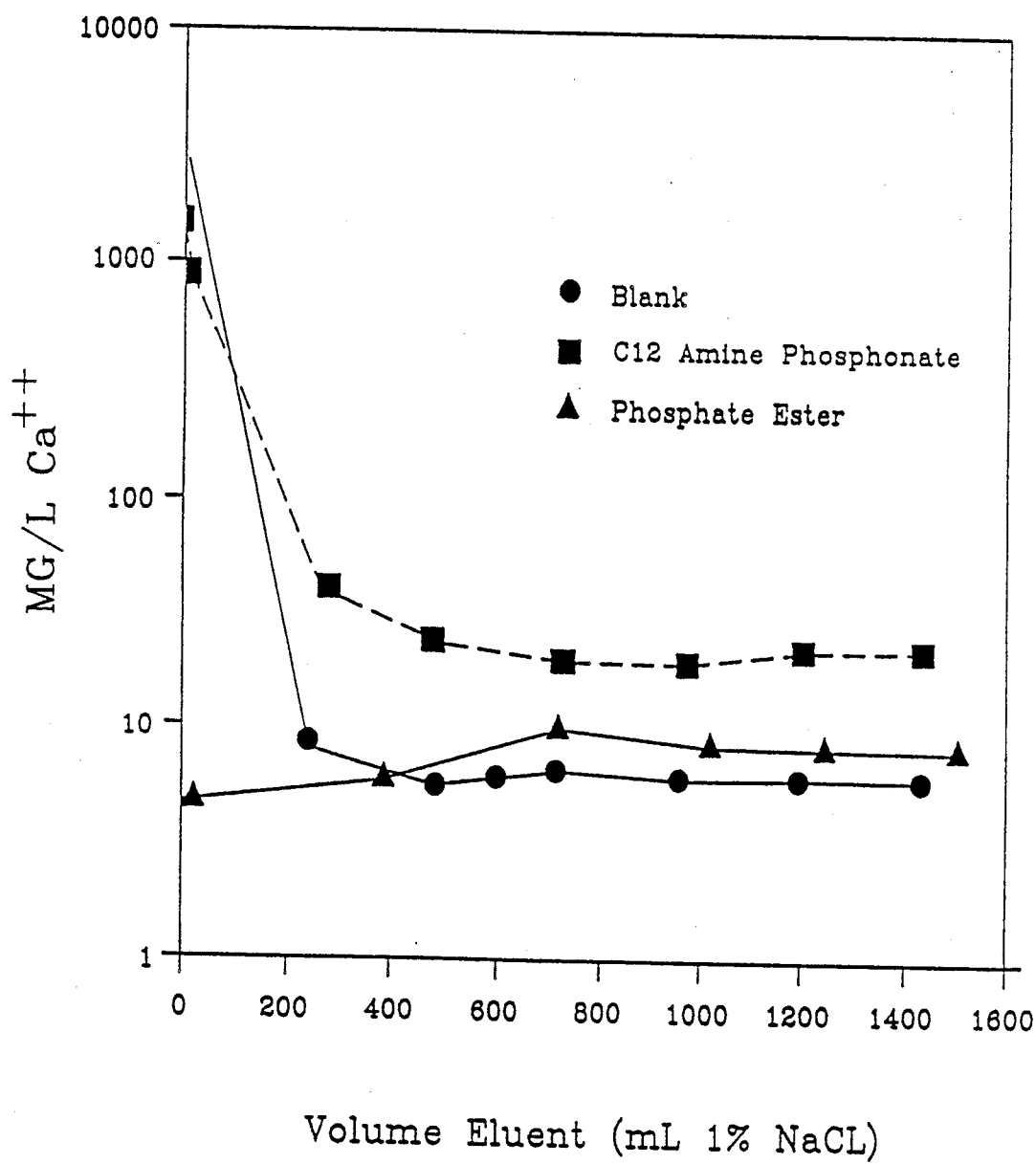
FIG. 1 is a graph in which residual calcium is plotted versus volume of NaCl brine effluent from a column.

In carrying out the process of the invention a water soluble surfactant metal salt which is capable of adsorbing onto sand grain surfaces is introduced via a wellbore into a non-carbonate (sandstone) subterranean formation. Usually this is followed by fresh water to displace surfactant remaining in the wellbore into the formation. A phosphonate solution or a solution of polymeric carboxylate is then introduced into the formation in a similar manner. This may be followed with another fresh water wash, if desired. The phosphonate or polymeric carboxylate inhibitor in the formation reacts with metal in the adsorbed surfactant salt and precipitates from solution. The precipitated metal-inhibitor redissolves slowly over a period of time as water is produced, thus providing scale inhibition over an extended period of time.

A variety of water soluble surfactants may be used in the process, including anionic or zwitterionic compounds which show a strong affinity for the reservoir (are highly adsorptive) and are capable of reacting or complexing with metal ions, such as calcium. Typically these surfactants will have the structures R-A, where R is a linear or branched alkyl hydrocarbon comprised of 6 to 16 carbons, an alkyl aryl hydrocarbon comprised of one or more aromatic groups combined with an alkyl chain of 2 to 16 carbons, or a primary or secondary amine comprised of 2 to 16 carbons and one or more nitrogens. And A is an anionic group, such as sulfonate, phosphate, phosphonate, or carboxylate.

The surfactant may also have zwitterionic character, such as:

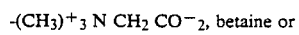

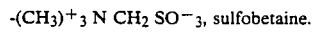

The water soluble surfactant metal salts having a terminal metal ion employed in carrying out the invention may be formed by reacting the surfactant with a suitable metal salt which forms a water soluble surfactant salt product and wherein the metals in the salts form an insoluble product when reacted with the phosphonate or polymeric carboxylate scale inhibitor. As used herein the term surfactant metal salt includes complexes as well as compounds. The metal salts include the metal halides, nitrates and other metal compounds which form water soluble surfactant salt products. Examples of suitable metal salts include such compounds as $CaCl_2$, $BaCl_2$, $CaNO_3$, $ZnCl_2$, $MnNO_3$, $SrCl_2$, $ZnCl_4$, and the like. The preferred metal salt is $CaCl_2$. The water soluble surfactant metal salt may be introduced to the subterranean formation in that form or may be formed in situ in the formation by separately introducing the surfactant and metal salt.

The amount of metal salt used in the reaction with the surfactant will not exceed stoichiometric and may be less depending on the particular metal salt and surfactant used. Usually sufficient metal salt is used to provide a saturated or close to saturated (clear) solution of the water soluble surfactant metal salt. Both the surfactant and metal salt are customarily provided in aqueous solutions varying in concentration from about 0.5 to about 20.0 wt % surfactant and from about 0.05 to about 5.0 wt % metal salt.

The water soluble surfactant salts having a terminal metal ion are prepared by combining an aqueous solution of the surfactant and the metal, with mixing as desired. The resulting surfactant salt solution is usually maintained at a pH of 6–8 to avoid damage to the formation. pH control is obtained by adding a base, such as NaOH or an acid, such as HCl to the surfactant salt solution. The surfactant salt solution may be prepared from any water source which may include brines, particularly those available from the reservoirs to be treated.

A wide variety of phosphonates may be used in carrying out the invention. Suitable inhibitors include nitrogen containing phosphonate compounds such as the salts of nitrilotri (methylene phosphonic acid) or diethylenetriamine-penta (methylene phosphonic acid). The acids are available from Monsanto Chemical Co. under the trade names DEQUEST 2000 and DEQUEST 2060. Other phosphonic acids available from Monsanto include ethylenediamenetetramethylene phosphonic acid (DEQUEST 2041) and sodiumaminotrimethylene phosphonic acid (DEQUEST 2006). All of the above phosphonic acids contain nitrogen; however, other phosphonic materials which do not, are also available and are also suitable in carrying out the process of the invention.

Other organic phosphonate inhibitors (disclosed in U.S. Pat. No. 3,483,925) which may be used are salts of either:

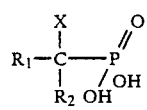

(a)

where $R_1$ is selected from the group consisting of H, alkyl groups up to four carbon atoms, phenyl, and phosphonic acid groups. $R_2$ is selected from the group comprising of hydrogen, alkyl groups having up to 4 carbon atoms and

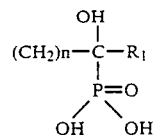

where n is an integer from 0 to 8, and X is H or OH, or

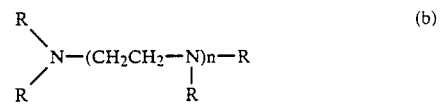

(b)

where R is selected from the group consisting of hydrogen and

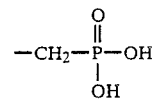

provided, however, that at least half of the species represented by R are

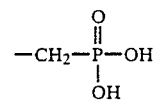

and n is an integer from 0 to 14. A specific example of (b) where n=0 is the sodium salt of amino trimethylene phosphonate.

Still other phosphonates which may be employed are the metal salts of polyalkalene polyamino polykis methylene phosphonic acids, which are disclosed in U.S. Pat. No. 3,619,427.

Additional organic phosphonates are disclosed in U.S. Pat. Nos. 3,214,454 and 3,336,221.

The polymeric carboxylates employed in carrying out the invention include carboxylic acids having the following general formula:

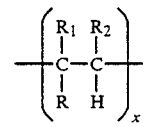

and polyphosphinylcarboxylates with the following formula

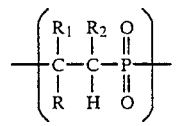

Where R is an alkyl group containing 0–2 carbon atoms,
  $R_1$ is a carboxylate group and
  $R_2$ is either hydrogen or a carboxylate group;
Illustrative specific examples of polymeric carboxylates are polyacrylic acid (2000 to 3000 molecular weight), polymaleic acid (same molecular weight range) and polyphosphinyl carboxylate (2000 to 4000 molecular weight).

The phosphonates are used in the process of the invention in the form of metal salts and must be soluble in the aqueous carrier liquid in which they are introduced to the formation. Usually the sodium, potassium or ammonium salts are employed. The polymeric carboxylates may also be used as metal salts; however, this is not required. Polymeric carboxylates are also introduced in an aqueous carrier liquid. The aqueous carrier liquid is preferably fresh water, however, brines may also be used. The concentration of phosphonate or polymeric carboxylate inhibitor in the carrier liquid is usually between about 1 and about 5 percent active inhibitor. The amount of inhibitor used may vary widely; however, usually the inhibitor is equal to not less than about 0.2% of one days water production from the formation. Since the amount of water produced in a given formation may vary widely, the amount of inhibitor may be substantially greater than 0.2 volume percent, particularly with lower amounts of water production. For example, if the formation produces only one barrel of water per day, the amount of inhibitor can be as high as 30 or 40% based on the produced water. The rate of introduction of inhibitor solution to the formation may be varied substantially; however, the rate must be kept sufficiently low so that the bottom hole pressure does not exceed the parting pressure of the formation.

The amount of surfactant salt employed in carrying out the invention may vary depending on the inhibitor. Usually, the amount of surfactant salt used is between about 1 and about 5 moles per mole of inhibitor.

The following examples illustrate the results obtained in carrying out the invention.

EXAMPLE 1

Tests were carried out to determine the retention of calcium ion on sand through the use of surfactants. In the tests a LUCITE column 0.5" i.d. and 36" long was filled with washed 20-40 mesh sand. The column was rinsed with 1% NaCl brine. Background levels of calcium in the eluted wash brine were less than 0.5 ppm. An alkyl phosphate ester surfactant KLEARFAC® AA-270, manufactured by BASF was diluted to provide 20% (wt) surfactant in distilled water. To 40 mL of this solution was added 10 mL of 5% (0.47M) $CaCl_2$. The combined 50 mL solution was pumped into the sand column at 3 mL/minute and allowed to soak at room temperature for 24 hours. The sand column was produced at 1 mL/minute with 1% NaCl brine. Samples were collected at timed intervals over approximately 24 hours. The samples were analyzed for calcium ion using ICP (inductively coupled plasma) spectroscopy. A second test was carried out with the same procedure using a linear $C_{12}$ amine phosphonate surfactant. A third test (Blank) was carried out without a surfactant.

The results of the tests are shown in FIG. 1 in which residual calcium is plotted versus volume of NaCl brine effluent from the column.

The graph in FIG. 1 clearly shows improved retention of calcium on the sand with the use of a surfactant.

EXAMPLE 2

Following the same procedure as in Example 1 a solution of KLEARFAC® AA-270 and $CaCl_2$ was pumped into the sand column of Example 1. After soaking for 24 hours at room temperature 50 ml of 2% solution of diethylenetriamine phosphonate (DETA) scale inhibitor was pumped into the column at 3 ml/minute and allowed to soak for 24 hours at room temperature. The sand column was then eluted with 1% NaCl brine at a rate of 1 ml/minute. A second test was carried out where only DETA was pumped into the column.

Figure 2:
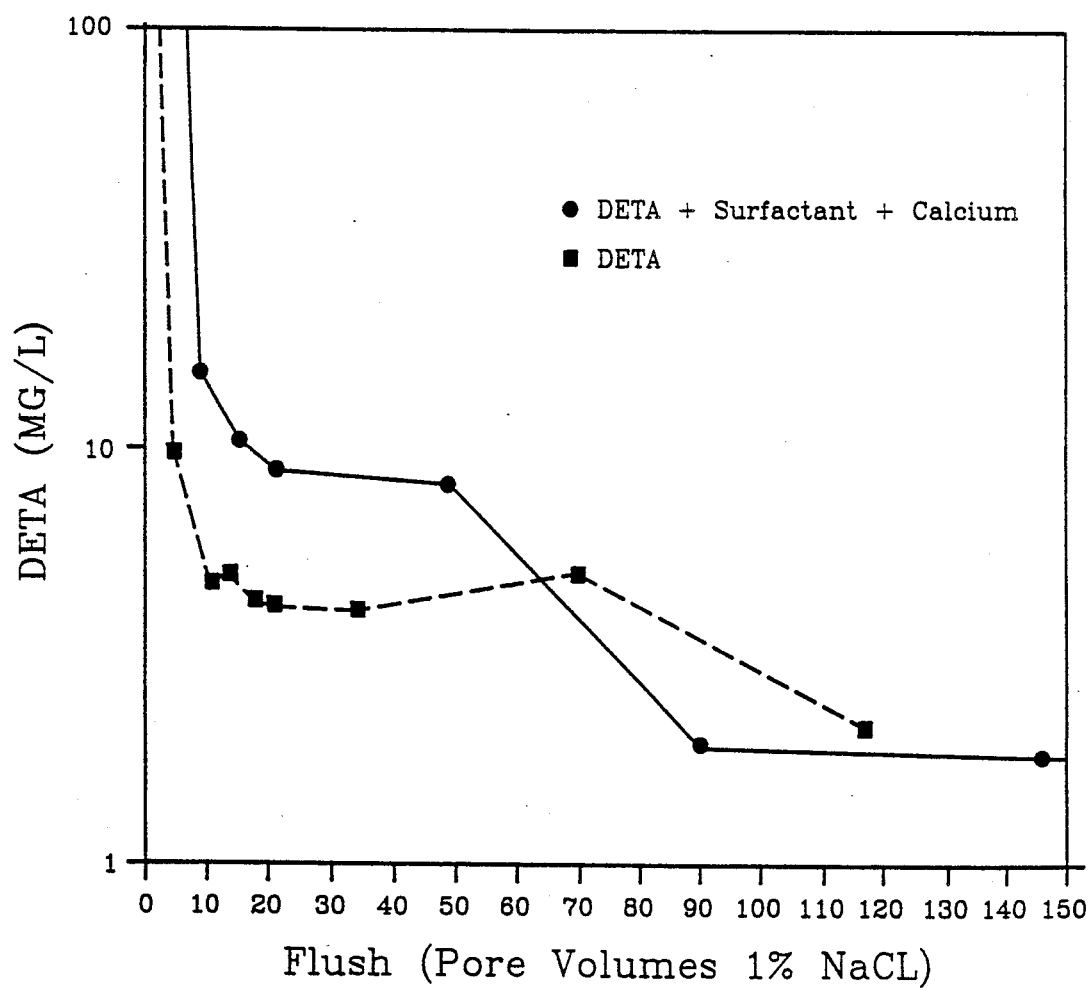
FIG. 2 is a graph in which residual scale inhibitor is plotted versus volume of NaCl brine effluent from a column.

The results of the tests are shown in the table and in FIG. 2 where residual scale inhibitor is plotted versus brine effluent from the column.

TABLE

| Flush (Pore Volumes) | Ca + DETA + Surfactant | Flush (Pore Volume) | DETA Alone |
|---|---|---|---|
| 3 | 7133.00 | 0.00 | 12200.0 |
| 9 | 15.10 | 1.50 | 253.0 |
| 15 | 10.40 | 4.50 | 9.8 |
| 21 | 8.90 | 10.50 | 4.7 |
| 48 | 8.40 | 13.50 | 5.0 |
| 90 | 1.90 | 18.00 | 4.2 |
| 144 | 1.80 | 21.00 | 4.1 |
| 252 | 1.63 | 33.75 | 4.0 |
| 288 | 1.68 | 69.75 | 5.0 |
|  |  | 117.90 | 2.1 |

The data shows that over the first 50 to 60 pore volumes of the flush, the DETA-surfactnt-calcium system retained substantially more of the scale inhibitor than the run where inhibitor alone was used.

While certain embodiments and details have been shown for the purpose of illustrating the present invention, it will be apparent to those skilled in this art that various changes and modifications may be made herein without departing from the spirit or scope of the invention.

I claim:

1. A treating process for inhibiting scaling by fluid which is produced from a non-carbonate subterranean reservoir via a wellbore which comprises injecting down the wellbore and into the reservoir a water soluble surfactant metal salt containing a terminal metal ion, said surfactant characterized as being adsorbable on the surfaces of the reservoir, and thereafter injecting into the reservoir an aqueous solution containing a scale inhibitor selected from the group consisting of phosphonates and polymeric carboxylates which reacts with the surfactant metal salt to form a metal-inhibitor which slowly dissolves in water produced from the reservoir.

2. The process of claim 1 in which the amount of scale inhibitor injected into the formation is at least 0.2% of the volume of fluid produced from the reservoir in 24 hours.

3. The process of claim 2 in which the concentration of active scale inhibitor in the aqueous solution is between about 1 and about 5 percent by weight.

4. The process of claim 3 in which the scale inhibitor is a phosphonate inhibitor.

5. The process of claim 4 in which the amount of surfactant metal salt is between about 1 and about 5 moles per mole of phosphonate inhibitor.

6. The process of claim 5 in which the amount of phosphonate inhibitor injected into the formation is at least 0.2% of the volume of fluid produced from the reservoir in 24 hours.

7. The process of claim 6 in which the concentration of active phosphonate inhibitor in the solution is between about 2 and about 5 percent by weight.

8. The process of claim 7 in which the phosphonate inhibitor is a nitrogen-containing phosphonate.

9. The process of claim 8 in which the amount of surfactant metal salt is between about 1 and about 5 moles per mole of phosphonate inhibitor.

10. The process of claim 6 in which the amount of surfactant metal salt is between about 1 and about 5 moles per mole of phosphonate inhibitor.

11. The process of claim 8 in which the metal salt is calcium chloride.

12. The process of claim 4 in which the terminal metal is calcium.

13. The process of claim 2 in which the amount of surfactant metal salt is between about 1 and about 5 moles per mole of scale inhibitor.

14. A treating process for inhibiting scaling by fluid which is produced from a non-carbonate subterranean reservoir via a wellbore which comprises reacting a surfactant, characterized as being adsorbable on reservoir surfaces, with a metal salt to form a water soluble surfactant metal salt having a terminal metal ion, injecting the surfactant metal salt down the wellbore and into the subterranean reservoir and thereafter injecting through said wellbore and into said reservoir an aqueous solution of a phosphonate scale inhibitor which reacts with the surfactant metal salt to form a metal phosphonate which slowly dissolves in water produced from the reservoir.

15. A treating process for inhibiting scaling by fluid which is produced from a non-carbonate subterranean reservoir via a wellbore which comprises separately injecting down the wellbore and into the subterranean reservoir a water soluble surfactant, characterized as being adsorbable on reservoir surfaces, and a metal salt which reacts with said surfactant to form a water soluble surfactant metal salt containing a terminal metal ion, and thereafter injecting through said wellbore and into said reservoir an aqueous solution of a phosphonate scale inhibitor which reacts with the surfactant metal salt to form a metal phosphonate which slowly dissolves in water produced from the reservoir.

16. The process of claim 15 in which the amount of phosphonate inhibitor injected into the formation is at least 0.2% of the volume of fluid produced from the reservoir in 24 hours.

17. The process of claim 16 in which the concentration of active phosphonate inhibitor in the solution is between about 2 and about 5 percent by weight.

18. The process of claim 17 in which the phosphonate inhibitor is a nitrogen-containing phosphonate.

19. The process of claim 18 in which the amount of surfactant metal salt is between about 1 and about 5 moles per mole of phosphonate inhibitor.

20. The process of claim 18 in which the metal salt is calcium chloride.

21. The process of claim 16 in which the amount of surfactant metal salt is between about 1 and about 5 moles per mole of phosphonate inhibitor.

* * * * *